Aug. 8, 1933.   R. E. HANSON   1,921,567
DIFFERENTIAL PRESSURE DEVICE
Filed May 19, 1930
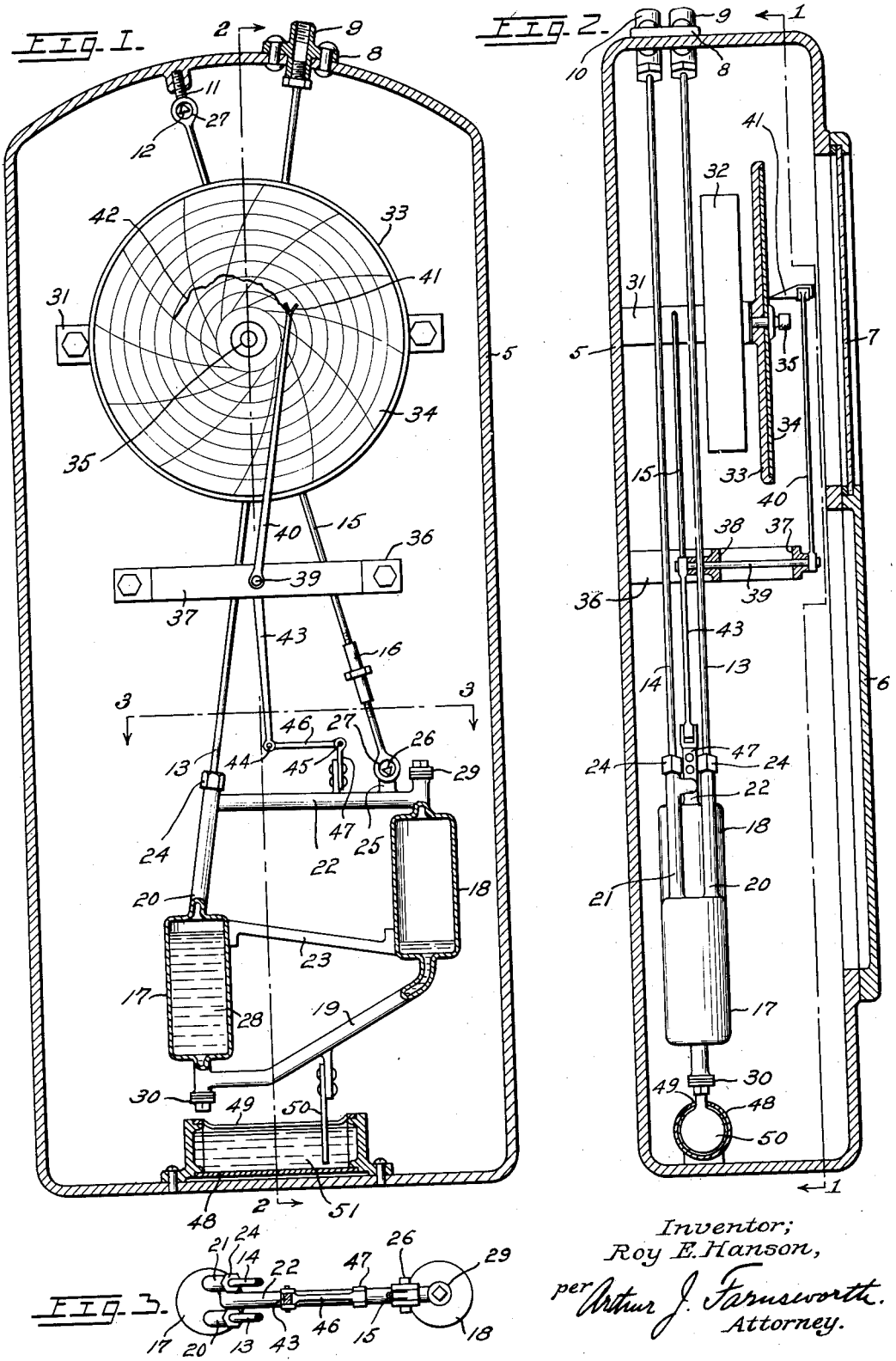
Inventor;
Roy E. Hanson,
per Arthur J. Farnsworth.
Attorney.

Patented Aug. 8, 1933

1,921,567

UNITED STATES PATENT OFFICE 1,921,567

DIFFERENTIAL PRESSURE DEVICE

Roy E. Hanson, Huntington Park, Calif.

Application May 19, 1930. Serial No. 453,630

10 Claims. (Cl. 73—31)

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to apparatus that is adapted for actuation by differential pressures. It may be utilized in connection with orifices or Pitot tubes, for indicating or measuring the flow of fluids, or for recording variations in the flow throughout a period of time. It may also be used as a source of power to operate or control electrical and mechanical auxiliaries in accordance with variations of differential pressures. Among the principal objects of the invention are: first, to eliminate the necessity for stuffing-boxes, floats, or other undesirable elements that are commonly required with devices of this nature; second, to reduce the frictional resistance of operation to a very small fraction of the force available for actuation, thereby accomplishing smooth operation, and a high degree of accuracy; third, to furnish a device of this nature that requires only a relatively small number of moving parts; and, fourth, to accomplish the above objects by means of a very simple construction that is not subject to deterioration over long periods of time, and that requires a minimum of inspection and up-keep expense.

My objects are attained in the manner illustrated in the accompanying drawing, in which:—

Figure 1 is an elevation of one form of my device that is adapted for recording differential pressures, the casing and some of the interior parts being shown in section;

Figure 2 is a cross-sectional elevation of the above apparatus, taken on the line 2—2 of Fig. 1, and with most of the interior mechanism shown in elevation; and, Figure 3 is a sectional plan view of certain details of the apparatus, taken on the line 3—3 of Fig. 1.

Similar reference numerals refer to similar parts throughout the several views.

The form of my invention that has been selected for illustrative purposes, comprises a housing 5, having a removable cover 6 at the front, and a transparent pane 7 opposite the indicating and recording elements. Attached to the top of the casing, at one side of the center, is a fitting 8, having two tapped connections 9 and 10, whereby the apparatus may be connected to different pressure sources, such as the opposite sides of an orifice plate or a Pitot tube in a flow line.

Opposite fitting 8, on the other side of the center line of the casing, is a stud bolt 11 carrying a knife-edge 12 projecting from each side.

The actuating element of my invention comprises a special form of pendulum, suspended from fitting 8 by means of a pair of very small flexible tubes 13 and 14; and from knife-edge 12 by means of a small rod 15, the length of this rod being variable by means of the turn-buckle 16. The tubes 13 and 14 are in the same plane, and the rod 15 passes between them, so as to cross the tubes.

The pendulum weight comprises a pair of pressure-tight mercury pots 17 and 18. One of these, as 18, is elevated above the other. These pots are cross connected at their bottoms by means of the tube 19. Pot 17 carries a pair of integral tubular nipples 20 and 21 at the top. The bore of nipple 20 communicates with the interior of pot 17. The bore of nipple 21 connects only with the interior of pot 18 by means of the upwardly sloping tube 22. The cross diagonal brace 23 is brazed to the two pots, and co-operates with tubes 19 and 22, to space and maintain them rigidly in their proper relative positions.

The two small flexible tubes 13 and 14 are connected to nipples 20 and 21 respectively, by means of suitable nuts 24, in such a way as to make pressure-tight joints. Tube 22 has an upstanding ear 25 brazed thereto, and this carries a knife-edge 26 projecting from each of its sides. Rod 15 is bifurcated at each end, and has opposite eyes 27 in each of these bifurcations. Knife-edges 12 and 26 engage eyes 27, and the pendulum body is supported in this manner in co-operation with tubes 13 and 14.

The above described pendulum arrangement is free to swing in a vertical plane, by the flexing of tubes 13 and 14. These tubes are relatively much smaller in diameter, and of much greater proportional length, than is shown in the drawing. The only resistance that opposes the swinging of the pendulum is the very small force required to flex these small, thin tubes, and the negligible friction of knife-edges 12 and 26.

A proper quantity of mercury 28 may be introduced into the pots, through filling plug 29, and it may be drawn off through drain plug 30.

In the upper part of the housing is a U-shaped support 31, on which is mounted a clock mechanism contained in casing 32. A rotary disk 33 is driven by the clock mechanism, and a suitably prepared paper chart 34 is attached to the disk by means of a thumb-nut 35.

A somewhat similar lower support 36, having two cross-members 37 and 38, carries a small shaft 39 rotatably mounted thereon. On the forward end of this shaft, a pen-arm 40 is affixed; the arm carrying an ink-pen 41 at the top, and the latter being adapted to mark the slowly revolving chart, as shown by line 42. The inner end of shaft 39 carries a downwardly extending lever 43 affixed thereon. The lower end of this lever is pivotally connected at 44 and 45, by means of link 46 and fitting 47, to tube 22. This mechanism causes the pen-arm 40 to move angularly, in proportion to the swinging of the pendulum, and thereby to draw the more or less irregular line 42 on chart 34.

The combination center of gravity of the composite pendulum weight, will depend upon the relative masses of mercury in the two pots. The spaces above the mercury are independently connected, in the manner described, to different pressure sources through the flexible tubes 13 and 14; and the lower ends of the pots are cross-connected by means of tube 19. Therefore the lateral position of the pendulum will depend upon the difference in the pressures within tubes 13 and 14, and the resulting shifting in position of the mercury mass. The containing portions of the pendulum body may be made relatively light in weight, by reason of the tubular construction used; and the mercury, being a very heavy liquid, will weigh many times as much as that of the other parts of the pendulum. Therefore any shifting in the center of gravity of the mercury mass will cause a strong deflecting force to be exerted upon the pendulum.

At the lower end of the casing is a small cylindrical tank 48, having a longitudinal slit 49 at the top. A paddle 50, that is attached to tube 19, extends downwardly through the slit and into a mass of mercury 51 within the tank. This arrangement obviously is adapted to function as a damper to prevent any rapid motion or vibration of the pendulum.

In the practical operation of my invention, after the device has been set up permanently, enough mercury is introduced through filling plug 29 to completely fill tube 19 and one of the pots that it connects. The pressures within tubes 13 and 14 are then equalized, and turnbuckle 16 is adjusted to bring pen 41 to the zero of chart 34. The mercury should then completely fill lower pot 17, and upper pot 18 should be empty. The pendulum will then be at its extreme right-hand position. The apparatus should be so designed that, in this position, tubes 13 and 14 are not flexed at all. Tube 13 is connected to the source of greater pressure, and tube 14 to the source of lesser pressure. As soon as there is any difference of pressure between these sources, a portion of the mercury in pot 17 will be forced thereby into pot 18, as shown in Fig. 1. This will shift the center of gravity of the composite pendulum, cause it to move to the left, and thus produce a corresponding angular movement of pen 41. The movement of the pen thereafter, will correspond to any changes in differential pressure to which tubes 13 and 14 are subjected.

In certain uses it may be desirable to add to the instrument an additional indicator or recording pen, to show static pressures. This may easily be accomplished in well known ways, as by mounting such an auxiliary device upon member 37, and a graphical record can be made thereby upon chart 34 or another chart. Such auxiliary devices are not a part of the present invention and have not been illustrated.

Instead of utilizing the movement of the pendulum for indicating or recording purposes, it may be employed to actuate electrical or mechanical controlling devices that require only a relatively small actuating force. Many such uses and adaptations of the present invention will occur to those familiar with such arts.

The purpose of elevating mercury pot 18 above pot 17, is to insure that the former will be wholly empty, and that the latter will be wholly filled with mercury, when the pendulum is at its extreme right hand position where pen 41 registers zero on the chart. The purpose of having suspension rod 15 cross the suspending tubes 13 and 14, is to aid in bringing about the above result, by tipping the pots as they approach either limit of their swing; and also to increase the tendency of the pendulum weight to swing in a true vertical plane. The ruling on chart 34 is prepared to correspond to the calibration characteristics of the instrument, so that the flexing resistance of tubes 13 and 14, as well as the tipping of the mercury pots, will be properly allowed for.

I claim:

1. A device of the character described, comprising; a pendulum, having spaced pressure chambers that are intercommunicating at their bottom, partly suspended by a pair of flexible tubes that communicate with the respective chamber tops and are adapted for establishing communication with separate pressure sources; and a mass of liquid partly filling said chambers, and filling their means of intercommunication.

2. A device of the character described, comprising; a pendulum including spaced pressure chambers at different elevations that are intercommunicating at their bottoms, partly suspended by a pair of flexible tubes communicating with the respective chamber tops and adapted for establishing communication with separate pressure sources; a mass of liquid partly filling said chambers, and filling their means of intercommunication; and means for indicating lateral displacement of said body with reference to a fixed point.

3. A device of the character described, comprising; a pendulum that is suspended, by a pair of flexible tubes and by a rod crossing the tubes and having a pivotal connection at each end, so as to be movable in a vertical plane, including spaced pressure vessels communicating with each other at their bottoms and adapted to communicate with separate pressure sources at their tops through said tubes respectively; and a liquid partly filling said vessels.

4. A device of the character described, comprising; a pendulum that is suspended, by a pair of flexible tubes and by a rod crossing the tubes and having a pivotal connection at each end, so as to be movable in a vertical plane, including spaced pressure vessels, at different elevations, communicating with each other at their bottoms and adapted to communicate with separate pressure sources at their tops through said tubes respectively; and a liquid partly filling said vessels.

5. A device of the character described, comprising; a pendulum that is suspended, by a pair of flexible tubes and by a rod crossing the tubes and having a pivotal connection at each end, so as to be movable in a vertical plane, including spaced pressure vessels, at different elevations, communicating with each other at their bottoms and adapted for connection to separate pressure sources at their tops through said tubes respectively; a liquid partly filling said vessels; and means for indicating the lateral displacement of the pendulum with reference to a fixed point.

6. A device of the character described, comprising; a pendulous body having separate pressure chambers that are intercommunicating at their bottoms; crossed members so supporting said body that it will be easily swingable in a vertical orbital arc, and which will cause the body to turn about a horizontal axis other than its orbital axis as it swings; a mass of liquid partly filling said chambers and filling their means of intercommunication; and flexible conduits communicating with the respective chamber tops and adapted for establishing communication with separate pressure sources.

7. Construction as set forth in claim 6, in combination with means for indicating the orbital displacement of the pendulous body with reference to a fixed point.

8. A device of the character described, comprising; a pendulous body having separate pressure chamber that are intercommunicating at their bottoms; crossed members so supporting said body that it will be easily swingable in a vertical orbital arc, and which will cause the body to turn about a horizontal axis other than its orbital axis as it swings; and a mass of liquid partly filling said chambers and filling their means of intercommunication; two of said supporting members being flexible tubes, communicating with the respective chamber tops and adapted for establishing communication with separate pressure sources.

9. A device of the character described, comprising; a pendulous body having separate pressure chambers that are intercommunicating at their bottoms; crossed members so supporting said body that it will be easily swingable in a vertical orbital arc, and which will cause the body to turn about a horizontal axis other than its orbital axis as it swings; and a mass of liquid partly filling said chambers and filling their means of intercommunication; two of said supporting members being spaced parallel flexible tubes, communicating with the respective chamber tops and adapted for establishing communication with separate pressure sources; and a third supporting member being a link having a pivotal connection at each end and crossing said flexible tubes between them.

10. Construction as set forth in claim 6, wherein the pressure chambers are at different distances from the orbital axis.

ROY E. HANSON.